(12) United States Patent
Lee et al.

(10) Patent No.: US 8,363,011 B2
(45) Date of Patent: Jan. 29, 2013

(54) CONTROL APPARATUS AND METHOD

(75) Inventors: Chia Hoang Lee, Maoli (TW); Jian Liang Lin, Tainan (TW)

(73) Assignee: National Chiao Tung University, Hsinchu (TW)

( * ) Notice: Subject to any disclaimer, the term of this patent is extended or adjusted under 35 U.S.C. 154(b) by 1130 days.

(21) Appl. No.: 12/171,599

(22) Filed: Jul. 11, 2008

(65) Prior Publication Data

US 2009/0051652 A1 Feb. 26, 2009

(30) Foreign Application Priority Data

Aug. 24, 2007 (TW) .............................. 96131340 A

(51) Int. Cl.
*G06F 3/033* (2006.01)

(52) U.S. Cl. ......... 345/158; 345/156; 345/169; 382/107

(58) Field of Classification Search .................. 345/158, 345/156, 169; 382/107; 463/37–38
See application file for complete search history.

(56) References Cited

U.S. PATENT DOCUMENTS

| | | | | |
|---|---|---|---|---|
| 6,501,515 B1 * | 12/2002 | Iwamura | ........................ | 348/734 |
| 6,587,574 B1 * | 7/2003 | Jeannin | ........................ | 382/107 |
| 6,757,557 B1 | 6/2004 | Bladen et al. | | |
| 6,844,871 B1 | 1/2005 | Hinckley et al. | | |
| 6,847,354 B2 | 1/2005 | Vranish | | |
| 2001/0040924 A1 * | 11/2001 | Hori et al. | ................ | 375/240.16 |
| 2002/0140667 A1 * | 10/2002 | Horiki | ............................ | 345/156 |
| 2003/0109322 A1 * | 6/2003 | Funk et al. | .................... | 473/222 |
| 2004/0022435 A1 * | 2/2004 | Ishida | ............................ | 382/190 |
| 2004/0125984 A1 * | 7/2004 | Ito et al. | ......................... | 382/103 |
| 2004/0141634 A1 * | 7/2004 | Yamamoto et al. | ........... | 382/104 |
| 2006/0001645 A1 * | 1/2006 | Drucker et al. | ............... | 345/156 |
| 2006/0040712 A1 * | 2/2006 | Ansari et al. | .................. | 455/566 |
| 2008/0042981 A1 * | 2/2008 | Katz | ............................ | 345/173 |

* cited by examiner

*Primary Examiner* — Lun-Yi Lao
*Assistant Examiner* — Sosina Abebe
(74) *Attorney, Agent, or Firm* — WPAT, P.C.; Anthony King

(57) ABSTRACT

The invention discloses a control apparatus capable of providing a user with a control over an object displayed on a display apparatus by a pointing device. The control apparatus includes an image capturing module, a separating module, a positioning module, a constructing module, and a processing module. The image capturing module is used to record an image sequence included N images. The separating module is applied to capture the pointing device image related to the pointing device from each image. The positioning module is used for calculating a specific point of the pointing device image of each image to generate a first set of specific point information. The constructing module is applied to generate a trajectory in accordance with a pre-defined criterion and the first set of specific point information. Additionally, the processing module is used to analyze the trajectory and generate a control signal to control the object.

23 Claims, 10 Drawing Sheets

CONTROL APPARATUS AND METHOD

BACKGROUND OF THE INVENTION

1. Field of the Invention

The present invention relates generally to a control apparatus and method, and more particularly, to an apparatus and method for three-dimensional control.

2. Description of the Prior Art

Recently, multimedia and entertainment software, such as media players or games, has been largely grafted to mobile apparatus such as mobile phone or PDA, to increase the pleasure of using said mobile apparatus. However, because most of the multimedia and entertainment software is developed for personal computer with all kinds of input apparatus, such as keyboard, mouse, or touch pad, it is not easy to apply said software in mobile apparatus without enough input apparatus.

There are some defects existed in the input apparatus of the prior art, such as keyboard, mouse, touch pad, trackball, or track point, and other input apparatus which have been applied in mobile apparatus such as direction key or point stick. Accordingly, said input apparatus can not provide a more convenient environment for a user to control the mobile apparatus. Furthermore, more and more above-mentioned multimedia and entertainment software need three-dimensional control, and it makes it harder for the input apparatus of the prior art to reach the goal.

For example, trackball applies ball-shaped wheel to control the position of cursor to reach the goal of pointing and interaction. Moreover, a user can control the moving speed of the cursor by controlling the moving speed of the trackball. However, the size of trackball is too large to be applied in mobile apparatus. Additionally, track point applies the point stick to control the position of cursor to reach the goal of pointing and interaction. However, the moving speed of the multi-directional key is fixed, and it can not provide 3D control function by itself.

For another example, touch pad applies a touch panel with sensing apparatus to reach the goal of pointing and interaction. However, the size of touch pad is too large, and it needs other input devices to provide three-dimensional control. Accordingly, touch pad is not suitable for mobile apparatus. Take the multi-directional key which has been applied in mobile apparatus for an example, it can control the directions of an object displayed on the screen of a mobile apparatus through a number of keys. However, the moving speed of the multi-directional key is fixed, and it can not provide 3D control function by itself. Furthermore, because the size of the mobile apparatus is smaller, highly-concentrated keys may make it easy for the user to press the wrong key.

U.S. Pat. No. 6,847,354 entitled "Three dimensional interactive display" discloses a three-dimensional interactive display and method of forming it. Moreover, the 3D interactive display includes a transparent capaciflector (TC) camera formed on a transparent shield layer on the screen surface to sense the movement of an object, such as a finger, so as to perform the 3D control. However, the cost of a TC camera is too high to be applied on a consuming mobile apparatus. Besides, the camera applied presently in the consuming mobile apparatus can not provide the same functions of a TC camera.

U.S. Pat. No. 6,844,871 entitled "Method and apparatus for computing input using six degrees of freedom" discloses a mouse that uses a camera as its input sensor. A real-time vision algorithm determines the six degree-of-freedom mouse posture, consisting of 2D motion, tilt in the forward/back and left/right axes, rotation of the mouse about its vertical axis, and some limited height sensing. Thus, a familiar 2D device can be extended for three-dimensional manipulation, while remaining suitable for standard 2D Graphical User Interface tasks. However, the size of the apparatus is too large, and the apparatus needs a specific panel. Therefore, the apparatus is not suitable for mobile apparatus.

Furthermore, U.S. Pat. No. 6,757,557 entitled "Position location system" discloses methods and apparatus for locating the position, preferably in three dimensions, of a sensor by generating magnetic fields which are detected by the sensor. The magnetic fields are generated from a plurality of locations and, in one embodiment of the invention, enables both the orientation and location of a single coil sensor to be determined. However, the magnetic field generator and detector are not suitable for mobile apparatus.

Accordingly, the control apparatus of the prior arts can not meet the requirement for performing three-dimensional control of an object on a mobile apparatus. Therefore, there is the need to develop a control apparatus to solve the problem.

SUMMARY OF THE INVENTION

Accordingly, one aspect of the present invention is to provide a control apparatus and method. Particularly, the apparatus and method of the invention can be applied for three-dimensional control on a mobile apparatus.

According to a preferred embodiment of the invention, the control apparatus can provide a user with the control of an object displayed on a display apparatus by a pointing device. The control apparatus of the invention includes an image capturing module, a separating module, a positioning module, a constructing module, and a processing module.

The image capturing module is used to record an image sequence includes N images, wherein N is a positive integer. The separating module is applied to capture the pointing device image related to the pointing device from each image. The positioning module is used for calculating a specific point of the pointing device image of each image to generate a first set of specific point information. Additionally, the constructing module is applied to generate a trajectory in accordance with a pre-defined criterion and the first set of specific point information. Furthermore, the processing module is used to analyze the trajectory and generate a control signal to control the object.

According to another preferred embodiment of the invention, the control method can provide a user with the control of an object displayed on a display apparatus by a pointing device. The method of the invention includes the following steps:

(a) records a video sequence and generates N image frames, wherein N is a positive integer.

(b) captures a pointing device image related to the pointing device from each image frame in accordance with a characteristic of the pointing device.

(c) calculates a specific point of the pointing device image of each image frame to generate a first set of specific point information.

(d) generates a trajectory in accordance with a pre-defined criterion and the first set of specific point information.

(e) analyzes the trajectory and generates a control signal.

(f) controls the object according to the control signal.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
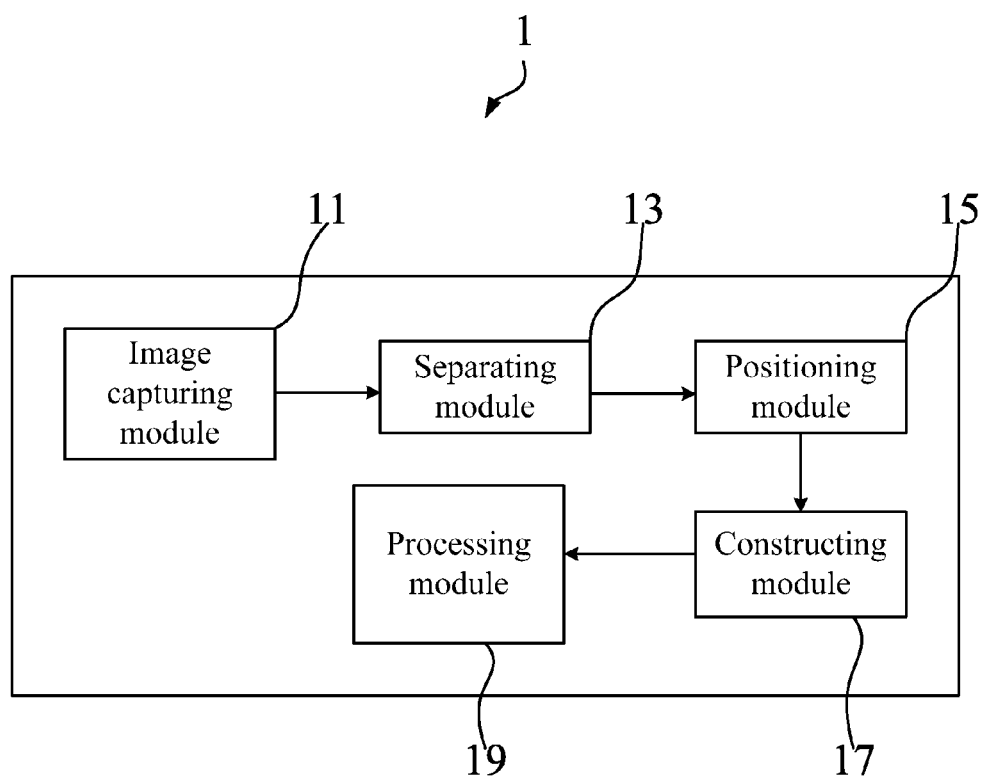
FIG. 1 illustrates a functional block of a control apparatus of an embodiment of the invention.

Please refer to FIG. 1, which shows a functional block of a control apparatus of an embodiment of the invention. The control apparatus 1 can provide a user with the control (such as three-dimensional control) of an object displayed in a display apparatus by a pointing device. In practice, the pointing device can be, but not limited to, such as a finger of the user, a touch pen, a writing pen, or other suitable devices.

As shown in FIG. 1, the control apparatus 1 includes an image capturing module 11, a separating module 13, a positioning module 15, a constructing module 17, and a processing module 19.

The image capturing module 11, such as a video camera or a camera, can be used to record a video sequence, which contains N image frames, wherein N is a positive integer. Practically, the N image frames include some images of the pointing device. In practice, the video camera can be a digital video camera, whereas the camera can be a digital camera.

The separating module 13 can capture a pointing device image related to the pointing device from each image frame in accordance with a characteristic of the pointing device. In practice, the characteristic can be the color of the pointing device or other suitable characteristics such as the shape or the structure of the pointing device.

The positioning module 15 can be used to calculate a specific point of the pointing device image of each image frame to generate a first set of specific point information. In practice, the specific point can be, but not limited to, a central point of the pointing device image.

The constructing module 17 can generate a trajectory in accordance with a pre-defined criterion and the first set of specific point information. Practically, the constructing module 17 can further determine if the trajectory is finished in accordance with the first set of specific point information. For example, if the trajectory stops at the edge of the image frame or the trajectory comes back to the center of the image frame, the constructing module 17 determines the trajectory is finished. Moreover, if the constructing module 17 determines the trajectory is finished, the constructing module 17 transmits the trajectory to the processing module 19.

In practice, the constructing module 17 further includes a counter. When the constructing module 17 further determines the trajectory is finished, it triggers the counter. Furthermore, when the counting is finished, the constructing module 17 transmits the trajectory to the processing module 19.

Furthermore, in practice, the above-mentioned first set of specific point information comprises a second specific point and a third specific point adjacent to the second specific point. Particularly, the pre-defined criterion is that when the difference between the second specific point and the third specific point is smaller than a pre-defined value, the trajectory comprises the third specific point. Accordingly, if the difference between the second specific point and the third specific point exceeds the predefined value, the constructing module 17 can delete the third specific point, and connects the stable second specific points to form the trajectory.

The processing module 19 can analyze the trajectory and generates a control signal to control (such as two-dimensional control or three-dimensional control) the object. In practice, the processing module 19 analyzes the trajectory to generate a direction information, a strength information, and a rotation angle information, or other suitable information. Furthermore, the direction information can include an upward information, a downward information, a leftward information, or a rightward information; and the rotation angle information can include a clockwise information or a counterclockwise information.

In the embodiment, the processing module 19 further comprises a classifier 191, such as a direction and rotation classifier, which can classify the above-mentioned direction information, strength information, and rotation angle information, so as to generate the control signal.

Figure 2:
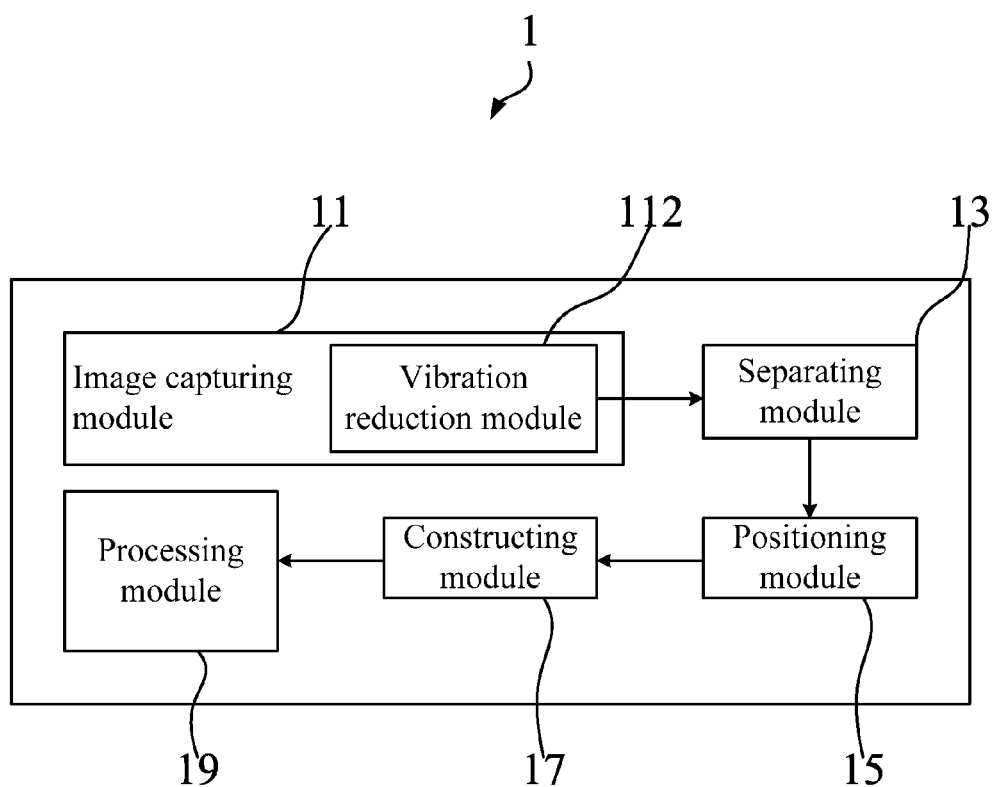
FIG. 2 illustrates a functional block of a control apparatus of an embodiment of the invention.

Please refer to FIG. 2, which illustrates a functional block of a control apparatus of an embodiment of the invention. As shown in FIG. 2, the image capturing module 11 further comprises a vibration reduction module 112 for removing a pre-defined noise, such as the noise generated by the image capturing module 11, or the interference caused by the user's action, from the video sequence, and further for generating the N image frames. Practically, the vibration reduction module 112 can perform the above-mentioned process by blurring/smoothing algorithm.

In practice, the control apparatus of the invention can be contained in a hand-held electronic apparatus. For example, the control apparatus of the invention can be integrated in a mobile phone or a personal digital assistant (PDA).

Figure 3:
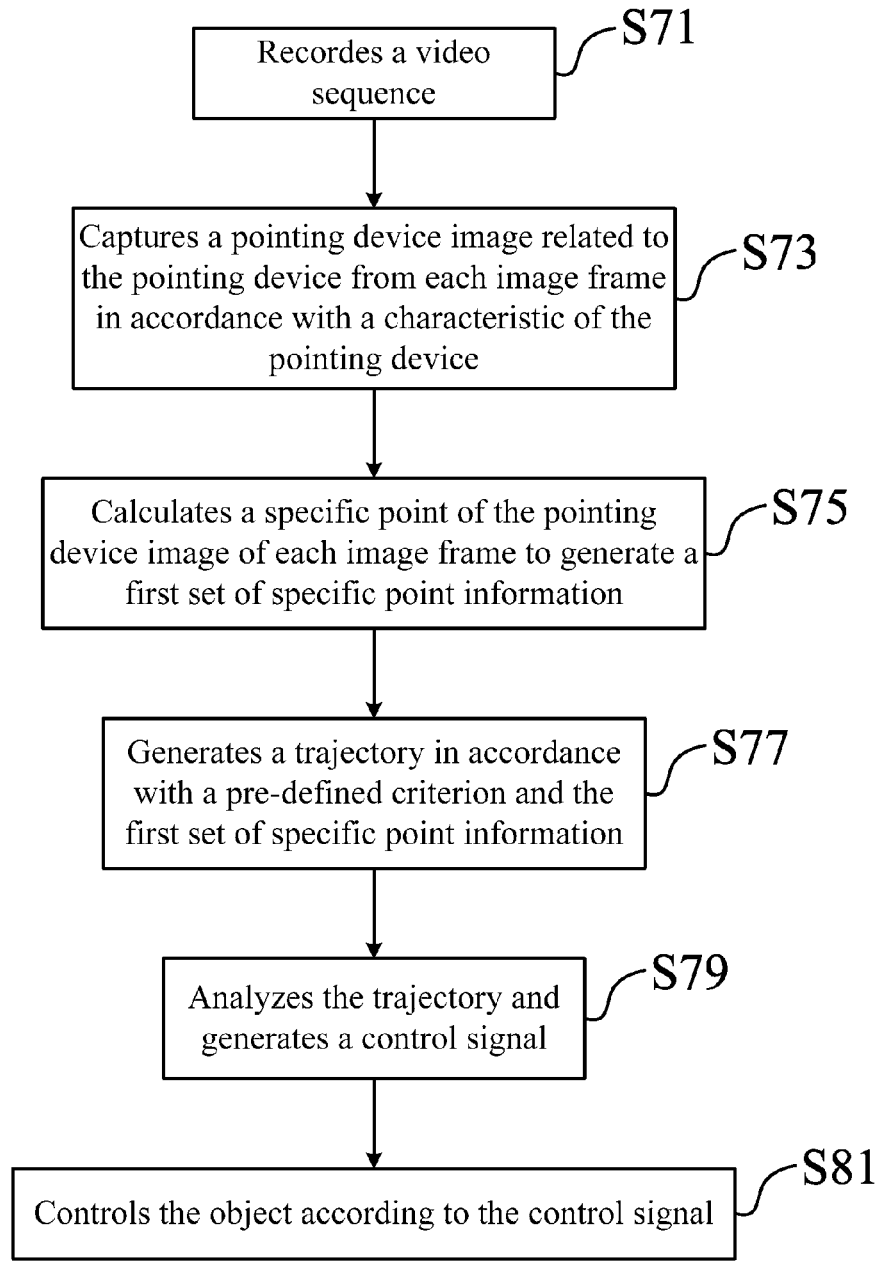
FIG. 3 shows a flow chart of a control method of an embodiment of the invention.

Please refer to FIG. 3, which shows a flow chart of a control method of an embodiment of the invention.

As shown in FIG. 3, the control method includes the following steps: first of all, in step S71, a video sequence is recorded and N image frames are generated, wherein N is a positive integer. Afterward, in step S73, a pointing device image related to the pointing device from each image frame is captured in accordance with a characteristic of the pointing device, such as the color of the pointing device.

Furthermore, in step S75, a specific point is calculated, such as the central point, in the pointing device image of each image frame, a first set of specific point information is generated. Afterward, in step S77, a trajectory is generated in accordance with a pre-defined criterion and the first set of specific point information.

In practice, the first set of specific point information comprises a second specific point and a third specific point adjacent to the second specific point. Particularly, the pre-defined criterion is that when the difference between the second specific point and the third specific point is smaller than a pre-defined value, the trajectory comprises the third specific point. Accordingly, if the difference between the second specific point and the third specific point excesses the pre-defined value, the third specific point can be deleted in step S77, and the stable second specific points can be connected to form the trajectory.

Furthermore, in step S79, the trajectory is analyzed and a control signal is generated. Practically, in step S79, the method of the invention analyzes the trajectory to generate a direction information, a strength information, and a rotation angle information, or other suitable information, and further generates the control signal in accordance with said information. Furthermore, the direction information can include at least an upward information, a downward information, a leftward information, or a rightward information; and the rotation angle information can include either a clockwise information or a counterclockwise information. Finally, in step S81, the object is controlled according to the control signal. In practice, the method of the invention can perform two-dimensional or three-dimensional control.

In an embodiment, the method of the invention can further include the following step: Removing a pre-defined noise from the video sequence and generating the N image frames. Practically, the above-mentioned process can be performed by blurring/smoothing algorithm.

Figure 4:
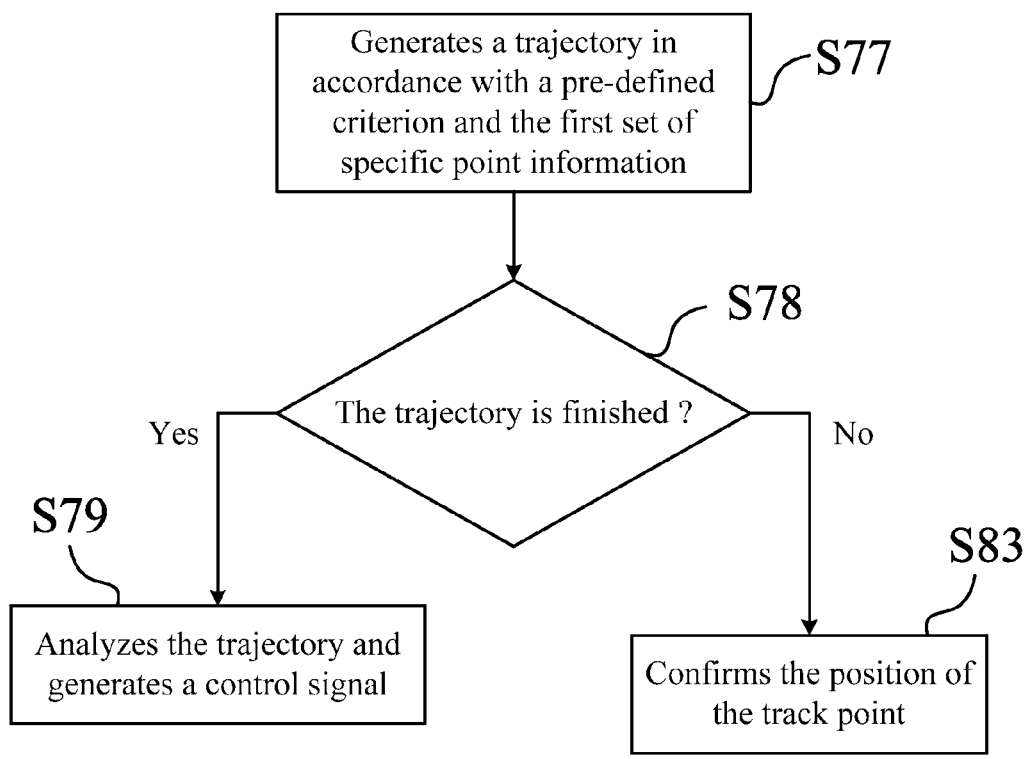
FIG. 4 shows a flow chart of a control method of an embodiment of the invention.

Please refer to FIG. 4, which shows a flow chart of a control method of an embodiment of the invention. In the embodiment, the method of the invention can further include step S78, in which it determines, in accordance with the first set of specific point information, whether the trajectory is finished. Moreover, if the answer of step S78 is yes, proceed step S79. On the contrary, if the answer of step S78 is no, proceed step S83, through which we can confirm the position of the track point.

Figure 5:
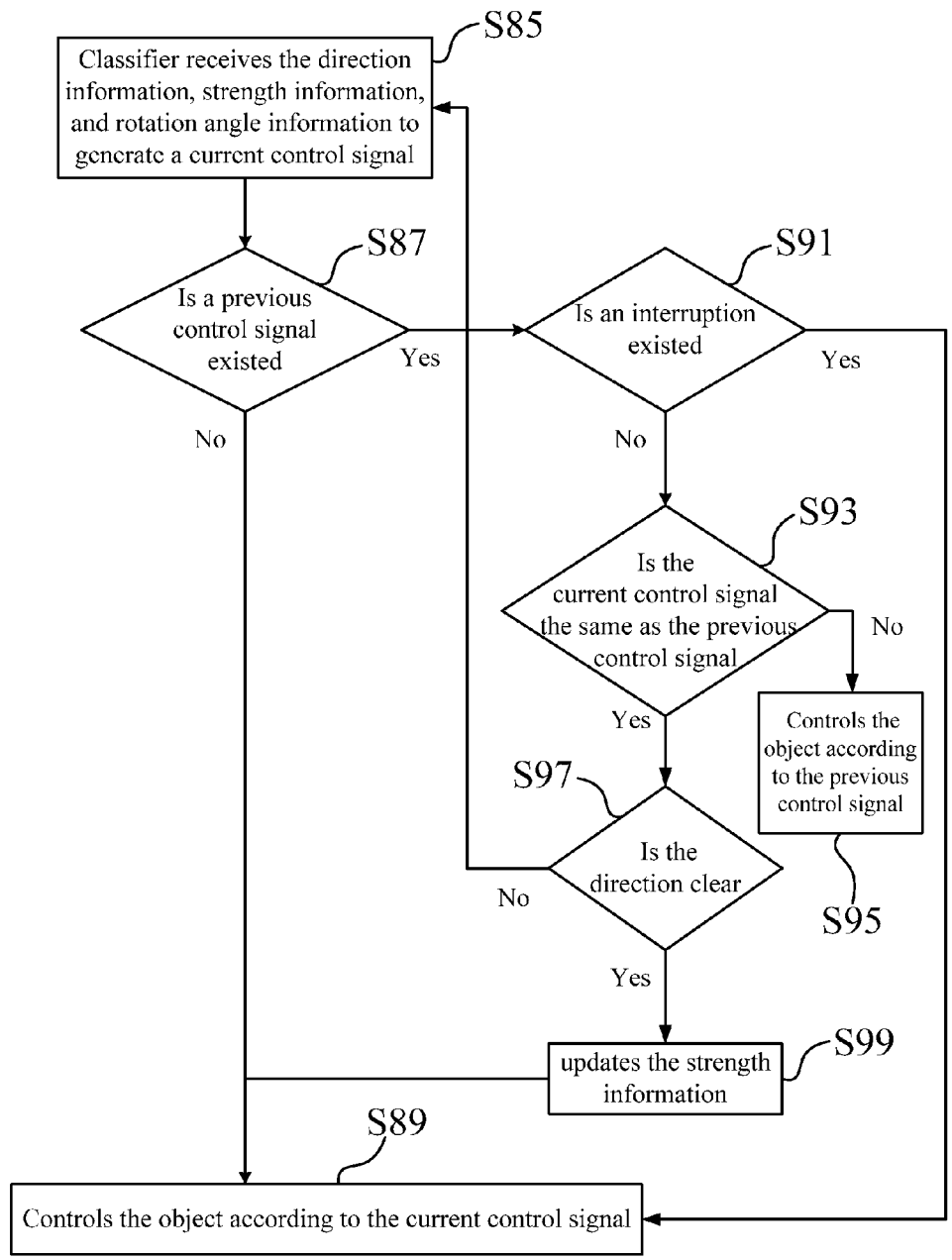
FIG. 5 shows a flow chart of a control method of an embodiment of the invention.

Please refer to FIG. 5, which shows a flow chart of a control method of an embodiment of the invention. In the embodiment, the method of the invention further includes a classifier to classify the above-mentioned direction information, strength information, and rotation angle information, so as to generate the control signal.

As shown in FIG. 5, in step S85, the classifier receives the direction information, strength information, and rotation angle information to generate a current control signal. Furthermore, in step S87, it determines if a previous control signal is existed, and if no, proceed step S89 and control the object according to the current control signal. On the contrary, if the answer is yes, proceed step S91, and determine whether an interruption exists and if the answer is yes, proceed step S89, control the object according to the current control signal. If the answer of step S91 is no, proceed step S93, determine whether the current control signal is the same as the previous control signal, and if no, proceed step S95, and control the object according to the previous control signal. If the answer of step S93 is yes, proceed step S97, determine whether the direction is clear, and if the answer is yes, proceed step S99, update the strength information. If the answer of step S97 is no, return to step S85.

Figure 6B:
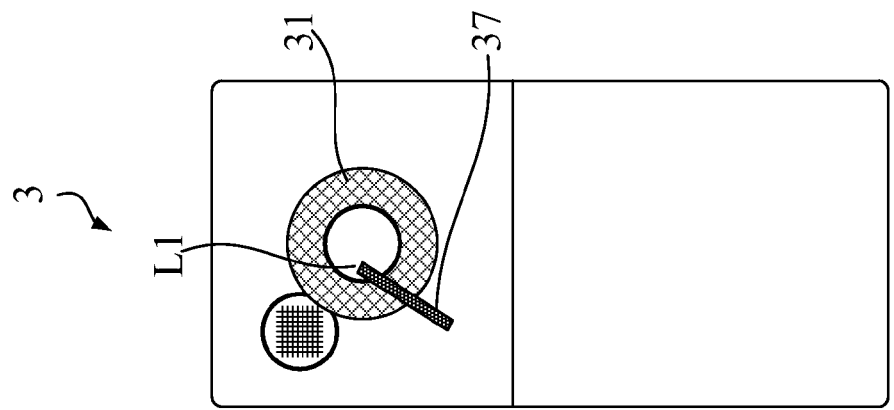
FIG. 6A to 6J illustrate a control process of an embodiment of the invention.
Figure 6A:
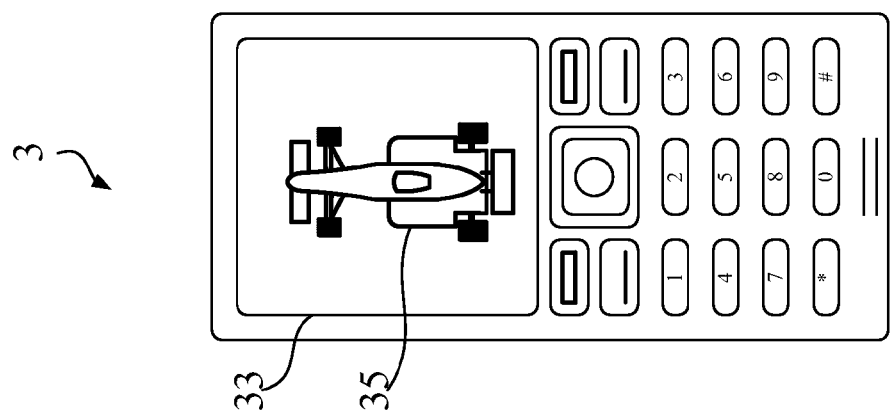

Please refer to FIG. 6A to 6J for a control process of an embodiment of the invention. As shown in FIG. 6A and FIG. 6B, the control apparatus and the display apparatus are integrated in a mobile phone 3. Moreover, the image capturing module of the invention is the photographic module 31 of the mobile phone 3, and the display is the screen 33 of the mobile phone 3. Furthermore, the object displayed on the screen 33 is an image of the racing car 35. Moreover, as shown in FIG. 6B, the photographic module 31 is on the back of the mobile phone 3, and the photographic module 31 can record the action of a pointing device 37. Additionally, the pointing device 37 is located at a first position L1.

Figure 6D:
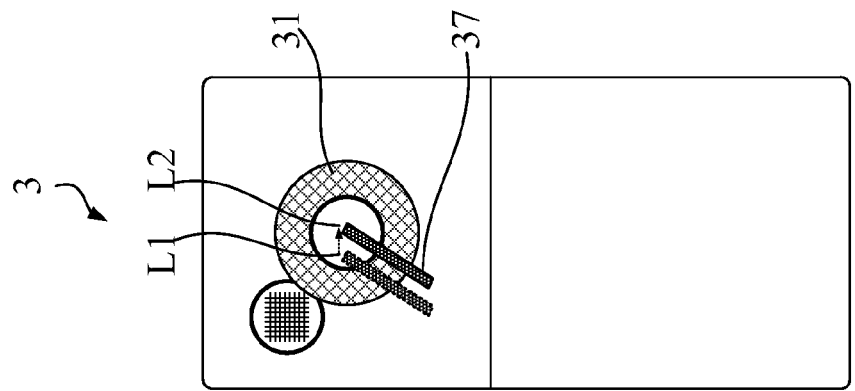
Figure 6C:
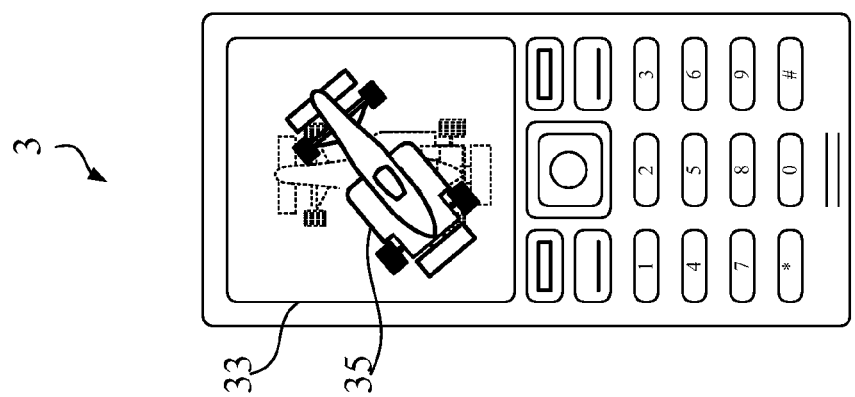

Furthermore, as shown in FIG. 6C and FIG. 6D, when the pointing device 37 moves from the first position L1 to a second position L2, the photographic module 31 can record a video sequence which contains a series of image frames of the movement of the pointing device 37. Afterward, the separating module (not shown) can separate the image of the pointing device 37 from the background image of each image frame according to the color of the pointing device. The positioning module (not shown) can further calculate the central point of the image of the pointing device 37 separated by the separating module. Moreover, the constructing module (not shown) generates the trajectory of the pointing device 37, and the processing module (not shown) analyzes the track information of the trajectory. Particularly, in the embodiment, the track information shows that the pointing device 37 moves to right. The processing module can further generate a control signal according to the track information. Moreover, in the embodiment, the control signal is a right turn signal, so that the processing module controls the image of the racing car 35 to turn right.

Figure 6F:
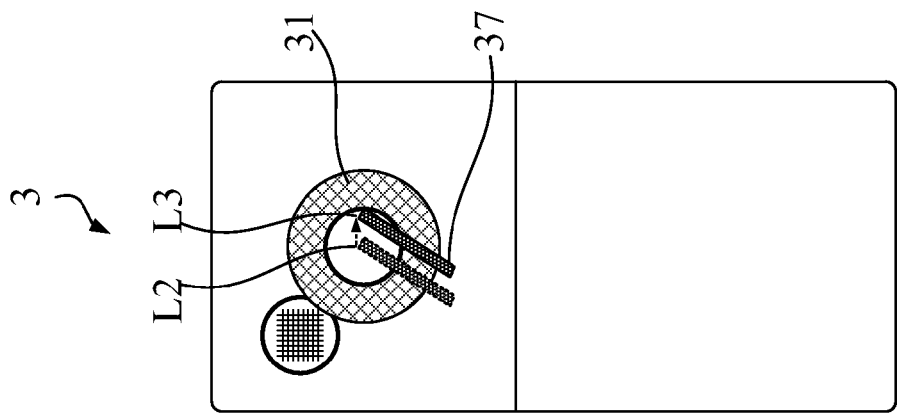
Figure 6E:
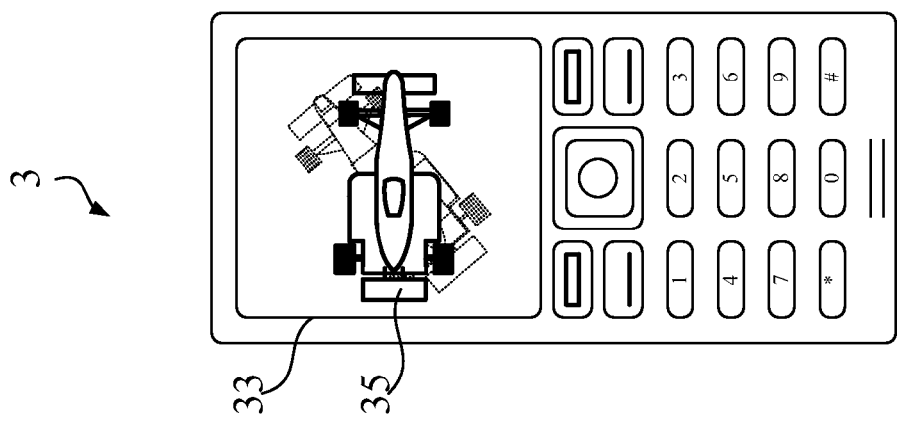

Furthermore, as shown in FIG. 6E and FIG. 6F, when the pointing device 37 moves from the second position L2 to a third position L3, the photographic module 31 can record a video sequence which contains a series of image frames of the movement of the pointing device 37. Additionally, the processing module controls the image of the racing car 35 to continuously making a right turn.

Figure 6H:
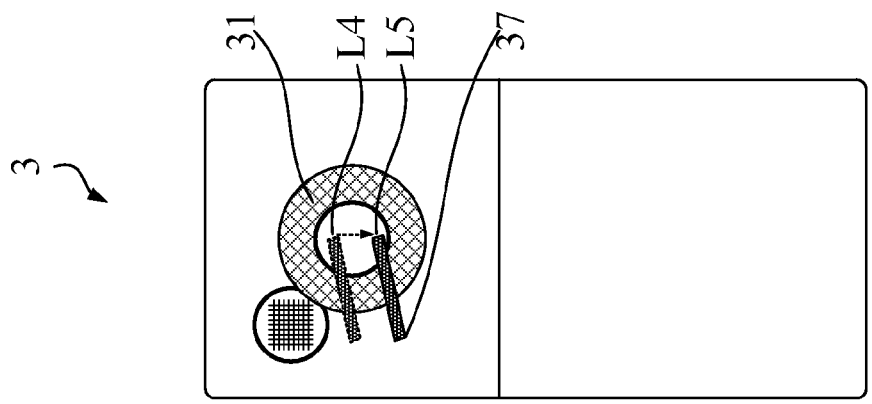
Figure 6G:
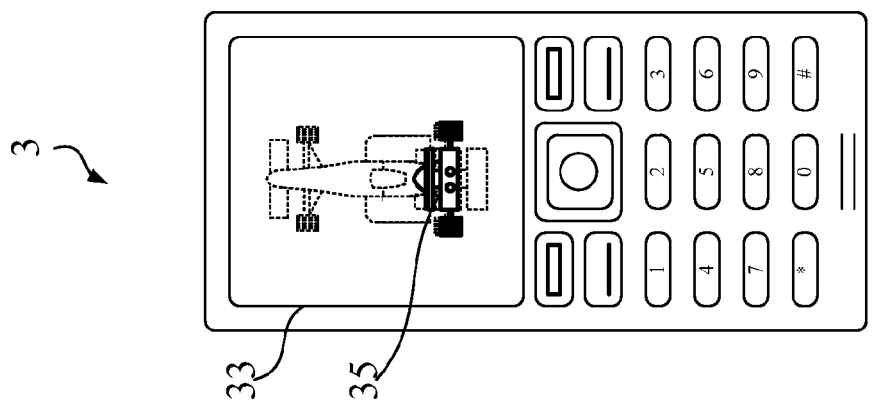

Furthermore, as shown in FIG. 6G and FIG. 6H, when the pointing device 37 moves from a fourth position L4 to a fifth position L5, the photographic module 31 can record a video sequence which contains a series of image frames of the movement (from top to bottom) of the pointing device 37. Moreover, the processing module of the invention analyzes the track information of the trajectory. In the embodiment, the track information is that the pointing device 37 moves to the bottom. The processing module further generates the control signal based on the track information, and in the embodiment, the control signal is a downward turn signal. Therefore, the processing module controls the image of the racing car 35 to turn down.

Figure 6J:
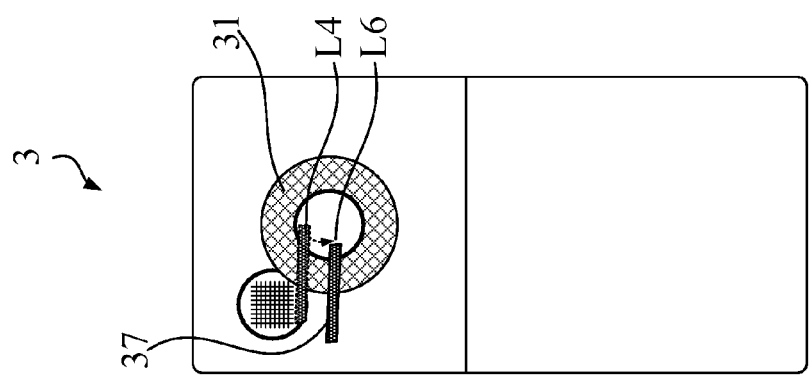
Figure 6I:
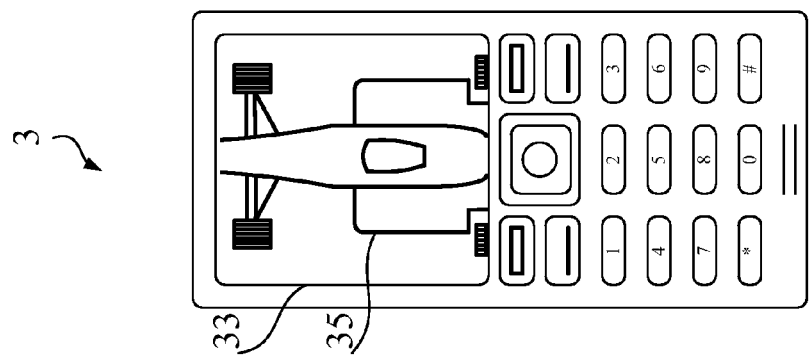

Furthermore, as shown in FIG. 6I and FIG. 6J, when the pointing device 37 moves counterclockwise from the fourth position L4 to the sixth position L6, the photographic module 31 can record a video sequence which contains a series of image frames of the movement of the pointing device 37. Moreover, the processing module of the invention analyzes the track information of the trajectory. In the embodiment, the track information is that the pointing device 37 rotates counterclockwise. The processing module further generates the control signal based on the track information, and in the embodiment, the control signal is an enlarged signal. Therefore, the processing module enlarges the image of the racing car 35. Practically, the relationship between the degree of enlargement and the rotation angle of the track information can be optionally set.

Please note that, in practice, the track information and the control signal can optionally be set, so as to perform three-dimensional control of the object. For example, the above-mentioned right-moving information can be set to correspond to a control signal such as right-moving control signal, or right-turning control signal. For another example, the track information of rotation clockwise 60° can be set to correspond to a control signal such as right-turning 10°, 60°, or 90°.

Obviously, the control apparatus can provide the user with easy performance of three-dimensional control of the object displayed in the display apparatus. Additionally, the control apparatus of the invention can be integrated in a hand-held electronic apparatus, and can perform complicated control, such as game control or virtual control, with the input module of the hand-held electronic apparatus.

Although the present invention has been illustrated and described with reference to the preferred embodiment thereof, it should be understood that it is in no way limited to the details of such an embodiment, but is capable of numerous modifications within the scope of the appended claims.

What is claimed is:

1. A control apparatus for providing a user with a control over an object displayed in a display apparatus by a pointing device, the control apparatus comprising:
    an image capturing module for recording a video sequence and generating N image frames, N being a positive integer;
    a separating module for capturing a pointing device image related to the pointing device from each image frame in accordance with a characteristic of the pointing device;
    a positioning module for calculating a specific point of the pointing device image of each image frame to generate a first set of specific point information;
    a constructing module for generating a trajectory in accordance with a pre-defined criterion and the first set of specific point information; and
    a processing module for analyzing the trajectory and generating a control signal to control the object;
    wherein, when the constructing module determines that generation of the trajectory is finished, the constructing module triggers a counter to execute a counting process;
    wherein, only after the counting process is finished, the trajectory is then transmitted to the processing module by the constructing module.

2. The control apparatus of claim 1, wherein the specific point of the pointing device image is a central point of the pointing device image.

3. The control apparatus of claim 1, wherein the first set of specific point information comprises a second specific point and a third specific point adjacent to the second specific point, and the pre-defined criterion is that when the difference between the second specific point and the third specific point is smaller than a pre-defined value, the trajectory comprising the third specific point.

4. The control apparatus of claim 1, wherein the processing module performs three-dimensional control of the object according to the control signal.

5. The control apparatus of claim 4, wherein the image capturing module further comprises: a vibration reduction module for removing a pre-defined noise from the video sequence, and generating N image frames.

6. The control apparatus of claim 5, wherein the vibration reduction module processes the video sequence by blurring/smoothing algorithm to remove the pre-defined noise.

7. The control apparatus of claim 1, wherein the image capturing module further comprises a video camera or a camera.

8. The control apparatus of claim 1, wherein the characteristic is the color of the pointing device.

9. The control apparatus of claim 1, wherein the processing module analyzes the trajectory to generate a direction information, a strength information, and a rotation angle information; and the processing module generating the control signal in accordance with the direction information, the strength information, and the rotation angle information.

10. The control apparatus of claim 9, wherein the direction information is an upward information, a downward information, a leftward information, or a rightward information.

11. The control apparatus of claim 9, wherein the rotation angle information is either a clockwise information or a counterclockwise information.

12. The control apparatus of claim 9, wherein the processing module generates the control signal in accordance with the direction information, the strength information, the rotation angle information, and a classifier.

13. A control method for providing a user with the control over an object displayed in a display apparatus by a pointing device, the control method comprising the following steps:
    (a) recording a video sequence and generating N image frames, N being a positive integer;
    (b) capturing a pointing device image related to the pointing device from each image frame in accordance with a characteristic of the pointing device;
    (c) calculating a specific point of the pointing device image of each image frame to generate a first set of specific point information;
    (d) generating a trajectory in accordance with a pre-defined criterion and the first set of specific point information, and determining, in accordance with the first set of specific point information, when the generation of the trajectory is finished, triggering a counter to execute a counting process, and then transmitting the trajectory only after the counting process is finished;
    (e) analyzing the trajectory and generating a control signal; and
    (f) controlling the object according to the control signal.

14. The control method of claim 13, wherein the specific point of the pointing device image is a central point of the pointing device image.

15. The control method of claim 13, wherein the first set of specific point information comprises a second specific point and a third specific point adjacent to the second specific point, and the pre-defined criterion is that when the difference between the second specific point and the third specific point is smaller than a pre-defined value, the trajectory comprising the third specific point.

16. The control method of claim 13, wherein step (f) performs three-dimensional control of the object according to the control signal.

17. The control method of claim 13, wherein step (a) further comprises the following step: (a1) removing a pre-defined noise from the video sequence, and generating N image frames.

18. The control method of claim 17, wherein step (a1) processes the video sequence by blurring/smoothing algorithm to remove the pre-defined noise.

19. The control method of claim 13, wherein the characteristic is the color of the pointing device.

20. The control method of claim 13, wherein step (e) analyzes the trajectory to generate a direction information, a strength information, and a rotation angle information, and generating the control signal in accordance with the direction information, the strength information, and the rotation angle information.

21. The control method of claim 20, wherein the direction information is an upward information, a downward information, a leftward information, or a rightward information.

22. The control method of claim 20, wherein the rotation angle information is either a clockwise information or a counterclockwise information.

23. The control method of claim 20, wherein step (e) generates the control signal in accordance with the direction information, the strength information, the rotation angle information, and a classifier.

* * * * *